United States Patent [19]

Schmit

[11] Patent Number: 5,144,880
[45] Date of Patent: Sep. 8, 1992

[54] FOOD DECORATING DEVICE AND METHOD

[76] Inventor: James R. Schmit, 2343 Carter Ave., St. Paul, Minn. 55108

[21] Appl. No.: 763,993

[22] Filed: Sep. 23, 1991

[51] Int. Cl.$^5$ .................... G01K 11/08; A23J 1/00
[52] U.S. Cl. .................................... 99/342; 99/493
[58] Field of Search ............ 374/160, 155; 116/216, 116/217, 218, 209; 99/342, 493

[56] References Cited

U.S. PATENT DOCUMENTS

| | | | |
|---|---|---|---|
| 1,387,890 | 8/1921 | Kleidman | 116/218 |
| 3,548,780 | 12/1970 | Kliewer | 116/218 |
| 3,559,615 | 2/1971 | Kliewer | 116/218 |
| 3,820,499 | 6/1974 | Kliewer et al. | 116/217 X |
| 4,175,512 | 11/1979 | Iwanicki | 116/217 |
| 4,748,931 | 6/1988 | Volk | 116/218 |
| 4,807,557 | 2/1989 | Lodisio | 116/281 X |
| 4,881,485 | 11/1989 | Feinberg | 116/209 X |
| 4,896,623 | 1/1990 | Seibert et al. | 116/209 X |

Primary Examiner—Daniel M. Yasich
Attorney, Agent, or Firm—James V. Harmon

[57] ABSTRACT

The invention provides a heat actuated decorative device for a food product that is either cooked or to be cooked. The device includes a hollow decorator supporting body adapted to be submerged in the food near an exposed surface of the food, and a heat responsive expandable decorative display body concealed inside the support housing. Initially, the decorative display device is preferably compressed or folded up inside the housing. During heating of the food, the decorative display body is expelled upwardly from the housing to a location on the surface of the food and expands outwardly over the surface of the food to provide a visible decorative display which ornaments the food product. In one preferred form of the invention, the food is completely or almost completely cooked first. The decorative deivce is then installed. The food is taken to the table or other serving location where additonal heat is provided, as by means of a hot plate, alcohol burner, etc., to actuate the invention and produce the display for those present.

20 Claims, 3 Drawing Sheets

FOOD DECORATING DEVICE AND METHOD

FIELD OF THE INVENTION

This invention relates to food decoration and more particularly to a decorating method and to a decorative device which is deployed to provide an ornamental display when the food is heated.

BACKGROUND OF THE INVENTION

Ornaments now used for food products are placed on the food by hand and undergo no change when the food is heated. A primary objective of the invention is to provide several forms of novel ornamental food decoration devices which are initially virtually invisible and only become readily visible upon heating or cooking the food for the greeting or entertainment of those to whom the food is served.

Heat actuated "doneness" indicators have been provided for food for indicating when the food has been cooked or has reached a particular temperature. These devices, however, are visible both before and after cooking and are not decorative, nor do they expand to a larger deployed condition through which they might provide a decorative and entertainment function.

SUMMARY OF THE INVENTION

The invention provides a heat actuated decorative device for a food product that is either cooked or to be cooked. The device includes a hollow decorator supporting body adapted to be submerged in the food near an exposed surface of the food, and a heat responsive expandable decorative display body concealed inside the support housing. Initially, the decorative display device is preferably compressed or folded up inside the housing. During heating of the food, the decorative display body is expelled upwardly from the housing to a location on the surface of the food and expands outwardly over the surface of the food to provide a visible decorative display which ornaments the food product. In one preferred form of the invention, the food is completely or almost completely cooked first. The decorative device is then installed. The food is taken to the table or other serving location where additional heat is provided, as by means of a hot plate, alcohol burner, etc., to actuate the invention and produce the display for those present.

DETAILED DESCRIPTION OF THE INVENTION

The invention provides decoration for cooked or baked food. It is initially either invisible or almost invisible but, upon heating or cooking the food, it provides a visible decorative display for the food. In this way, the invention provides a great deal of entertainment for those to whom the food is being served. It is particularly enjoyable for use on special occasions such as birthdays, anniversary parties, graduations, sales meetings, etc. In one preferred form of the device, the housing comprises a hollow cylinder having a decorative and expandable heat-actuated activated display body that is compressed or folded inside the housing. Upon heating, the display body is expelled, e.g. by means of a compressed spring or simply through its own expansion in the event the display device is a fluid. In this way, the invention amuses and entertains those present by providing interesting visible changes in the food. It can also provide fanfare by causing the food to take on a new, unusual and entertaining appearance, or the appearance of some particular object such as a cake in the shape of a volcanic mountain or a greeting card which can be eaten after the person is greeted. The invention can be employed both for foods that are warmed after being cooked as well as for foods that are cooked from a raw condition.

These and other more detailed and specific objects of the present invention will be apparent in view of the following description setting forth by way of example but a few of the various forms of the invention that will be apparent to those skilled in the art once the principles described herein are understood.

THE FIGURES

DESCRIPTION OF THE PREFERRED EMBODIMENTS

Figure 1:
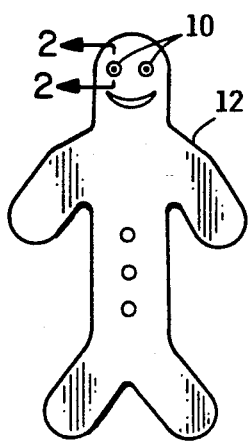
FIG. 1 is a plan view of a food article decorated by means of the invention.
Figure 2:
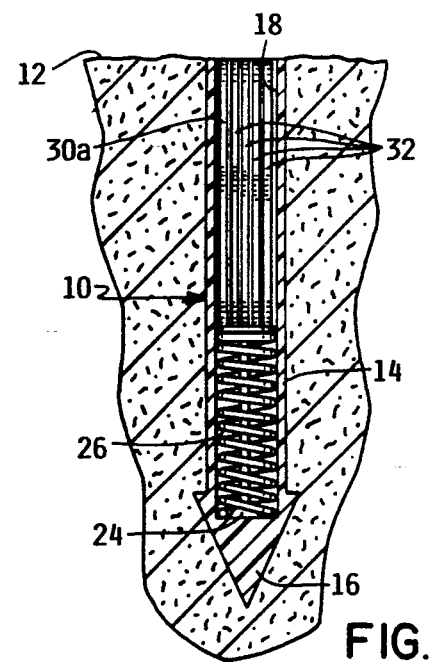
FIG. 2 is a vertical cross-sectional view taken on line 2—2 of FIG. 1 on a greatly enlarged scale and before the decorative device is deployed.
Figure 3A:
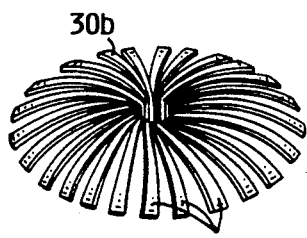
FIG. 3A is is a perspective view of the display of FIGS. 1-3 after deployment.
Figure 3:
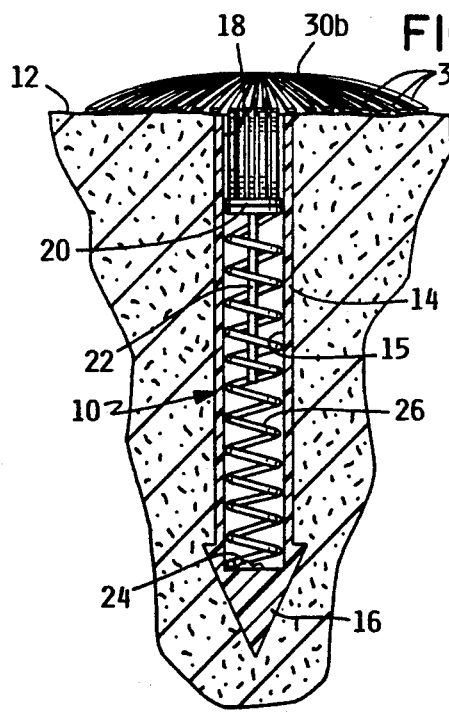
FIG. 3 is similar to FIG. 2 after deployment of the decorative device.

Refer now to FIGS. 1-3A which illustrate one form of the invention by way of example. As shown in FIG. 1, two decorative devices 10 in accordance with the invention are inserted into the top surface of a food product 12, in this case a body of dough which when cooked becomes a gingerbread man, i.e., a gingerbread cookie. Before heating or cooking, the devices 10 are practically invisible as shown in FIG. 2, but after heating, as shown in FIGS. 3 and 3A, the decorative device 10 is expelled and deployed to an expanded condition on the surface of the food 12. In this way it becomes highly visible, as will be described.

The decorative device 10 includes a hollow housing 14 in the form of a vertically disposed elongaged tube with a pointed lower end 16 to facilitate its insertion into the food 12 in an upright position with its upper end near the surface of the food product as shown in FIGS. 2 and 3. The housing 14 has a vertical bore 15 with an open upper mouth at 18 directed upwardly and located at the surface or close to the surface of the food. Inside the hollow cylindrical bore 15 is a plunger 20 that is rigidly connected to a downwardly extending retaining rod 22, the lower end of which is normally cemented to the bottom of the cylindrical bore 15 by means of a thermoplastic adhesive 24; e.g., a suitable hot-melt adhesive of the type commercially available from hardware outlets for application with an electrically heated glue gun. Other thermoplastic adhesives will be apparent to those skilled in the art. Adhesive 24 is, however, not utterly essential to the invention. For example, the rod 22 can be held by friction in an opening (not shown) at the lower end of the housing 14 which is adapted to expand as the housing becomes heated, thereby releasing the rod 22 from its grip.

The rod 22 that holds the spring 26 under compression is released by the melting of the adhesive 24 at a pre-set temperature. As soon as the retaining rod 22 is released, the plunger 20 is pushed upwardly by means of a helical spring 26 which is normally in a compressed condition as shown in FIG. 2. The display device is shown in FIG. 2 at 30a within the housing 14 before deployment. In this case, the display device comprises a large number of strands or fibers 32 of a decorative material such as colored or metallized plastic strips. The strips 32 are springy, i.e., resilient and contain a natural curl or bend. They are held straight when contained within the housing 14, but when the plunger 20 rises as shown in FIGS. 3 and 3A, the strips 32 spread apart because of their springy character which causes them to curl outwardly and thereby spread over the surface of the dough or other food 12 to provide eyes for the gingerbread man or other food article, much to the entertainment and delight of those using the invention. The strands 32 can also be shaped to represent the petals of a flower. The strands can be made of various materials and can even be edible. The invention can be used on any type of food, such as cakes, puddings, breads, pies and the like, or can be floated on the surface of soup.

Figure 4:
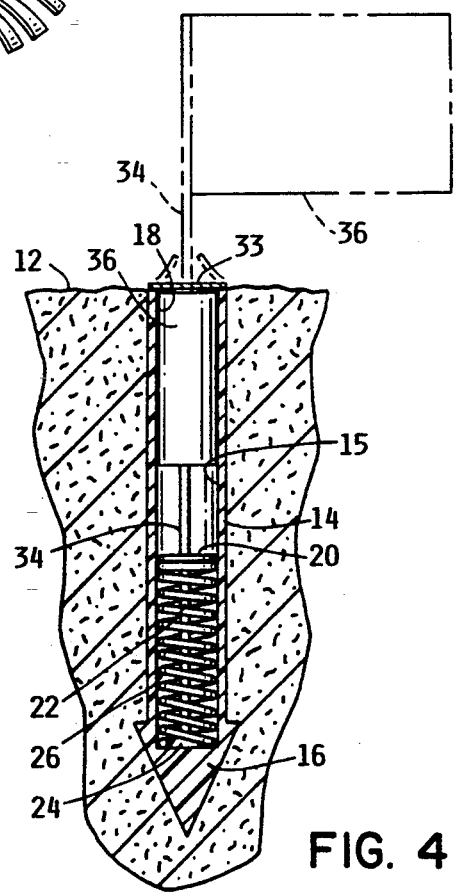
FIG. 4 is a view similar to FIG. 3 of another form of the invention.

Refer now to FIG. 4 which shows another embodiment of the invention in which the same parts bear the corresponding numbers already described. As shown in FIG. 4, the plunger 20 is provided with a centrally located, vertically disposed flagstaff 34 having a unfurled rectangular sheet 36, e.g. formed from plastic film, coiled around it. The top of the bore 15 is normally sealed by means of a fragile cover 33 which can be a thin layer of plastic film such as lightweight polyethylene or cellophane. The sheet 36 representing the flag can be formed from a plastic such as polyethylene or Mylar ® that is normally flat but is rolled up to fit within the hollow cylindrical opening 15 of the housing 14. The plastic sheet 36 is thus formed from a material which is flat and has a plastic memory even after being coiled that enables it to immediately uncoil as soon as it is released from the coiled up position assumed when within the housing 14. The sheet 36 is preferably printed with an entertaining message such as "Happy Birthday," "Congratulations," etc.

During heating of the food, after the thermoplastic cement 24 has melted, the spring 26 forces the plunger 20 upwardly, thereby pressing the flagstaff 34 against the cover 33, rupturing it and forcing the flag through the opening 18 at the top of the housing 14 so that the flagstaff 34 extends vertically as shown by dotted lines. The sheet 36 then unfurls itself owing to the tendency for the plastic sheet to uncoil and assume a flat condition.

Figure 5:
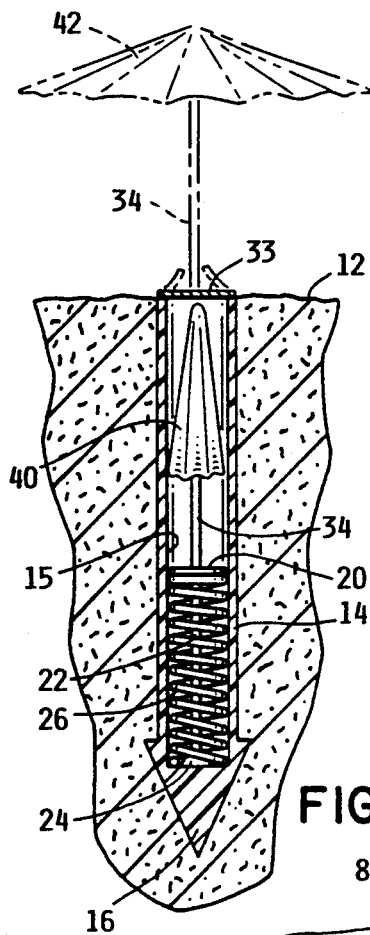
FIG. 5 is a view similar to FIGS. 3 and 4 of another form of the invention.

Refer now to FIG. 5 in which the same parts have been given numbers corresponding to the components already described.

In this embodiment of the invention, the staff 34 instead of being provided with a flag is provide with a compressed umbrella 40 which can be formed from a sheet of plastic or cloth and, if cloth, is optionally supported by radially extending ribs beneath the sheet material forming the umbrella 40. In any event, the collapsed umbrella 40 composed of the sheet material is resilient and expandable because of an elastic memory which causes it to expand to the dotted line position at the top of the figure when the spring 26 forces the plunger 20 to the top of the hollow bore 15 of the housing 14. The cover 33 is ruptured or breaks away from the housing 14 at the edges, if desired, as the umbrella 40 is forced upwardly. The operation is otherwise the same as already described. When the decorative umbrella 40 is forced upwardly to the deployed position, it expands outwardly over the surface of the food 12 to provide a visible decorative display which serves as ornamentation for the food product. The umbrella 40 can also be printed with a suitable inscription such as "Happy Anniversary", "Congratulations on Sales Achievement", etc.

Figure 6:
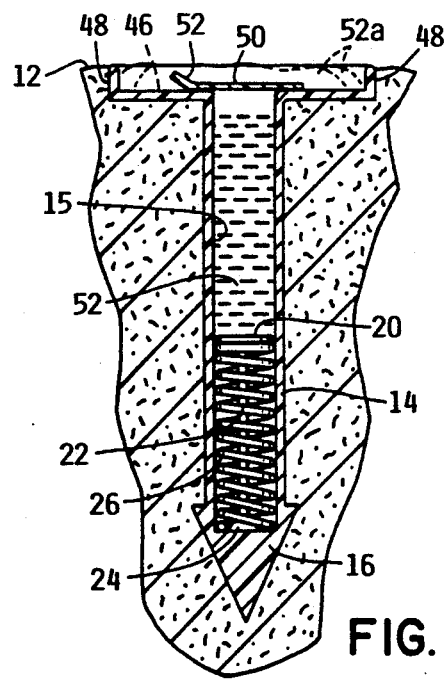
FIG. 6 is a view similar to FIG. 5 of still another form of the invention.

Refer now to FIG. 6 wherein the same parts have been given numbers corresponding to the components already described. In this case, the housing 14 within the bore 15 has a laterally extending tray portion at the top that consists of a bottom wall 46 and a peripheral upwardly extending, circumferential lip 48 that forms a tray or pan with the bottom horizontal wall 46. Above the plunger 20 is a decorative, edible fluid 52 such as liquid frosting or colored syrup. The upper open end of the hollow housing 14 is sealed by means of a removable cover sheet 50 that is normally held in place by means of a pressure sensitive adhesive. The cover 50 can be provided with a lifting tab 52 to facilitate its removal. The tray 46, 48 can be of any suitable shape; e.g., it can be circular, oblong or curved so as to form different shapes such as the shape of a mouth in a smile like that shown in FIG. 1, so that after the food is baked, the smile previously invisible appears on the surface of the article formed from the dough body 12. The tray 46, 48 is optional If desired, one or more jet openings (not shown) can be provided to spread the fluid at 52a to the desired shape as it is forced toward the surface.

During operation, as soon as the thermoplastic adhesive 24 melts, the spring 26 forces the plunger 20 up through the hollow interior of the housing 14, thereby forcing the decorative fluid 52 out onto the tray 46, 48. It then expands laterally as shown at 52a, covering more and more of the food article 12 to provide an expanding decorative display for the entertainment of the users. In this case, the housing 14 and tray 46, 48 are preferably transparent plastic and are therefore barely visible. The fluid 52 can be a brightly colored, e.g. red, blue, yellow or orange sugar syrup.

Figure 7:
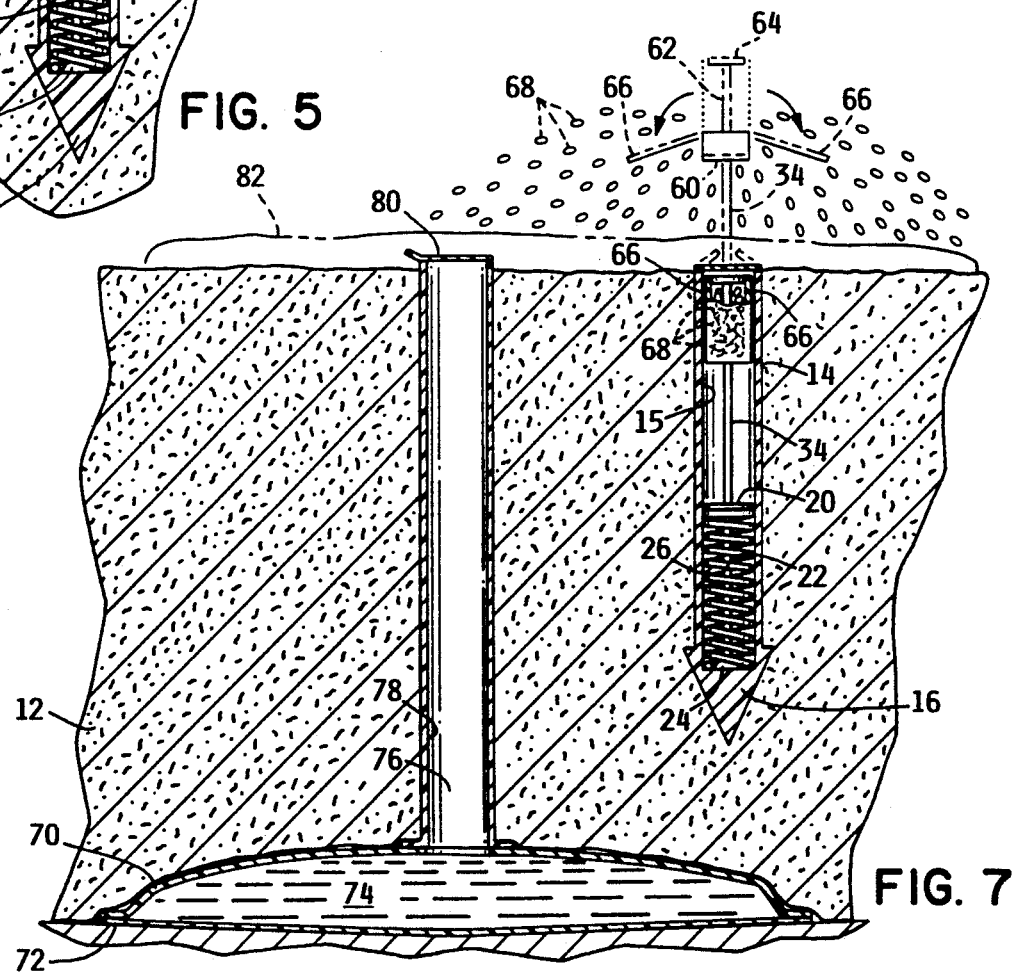
FIG. 7 is a vertical sectional view of two additional forms of the invention.

Refer now to FIG. 7 in which the same parts have been given numbers corresponding to the components already described.

In this case, the decorative device has a supporting shaft 34 with a hollow compartment or chamber 60 at its upper end. The chamber has an upper wall 64 supported on a post 62 and doors 66 which are hinged to the bottom of the compartment 60. The compartment 60 contains decorative material such as colored sugar granules 68. During operation, after the plunger 22 is released by the application of heat as already described, it is forced upwardly by the spring 26 causing the shaft 34 to lift the hollow chamber 60 to the deployed, dotted line position whereupon the doors 66 swing downwardly under the influence of gravity and the colored sugar 68 is sprinkled over the surface of the cake or other food 12.

Also provided is a flexible envelope, e.g. a flexible plastic envelope 70 having a pair of opposed walls formed preferably from plastic film sealed together at their edges 72 and containing a decorative edible fluid 74 such as colored sugar syrup or liquid frosting. The envelope 70 is placed within the food body 12 around the floor of the pan or other receptacle containing the food, usually before the food 12, e.g. dough or batter, is placed in the receptacle. Bonded to the top of the flexible and collapsible envelope 70 is a vertically disposed hollow tube 76 containing a hollow bore 78 and normally sealed by means of a cover sheet 80 which is secured to its upper open end but which can be easily removed, either by internal pressure or by being lifted off manually before use. The form of the invention having parts 70, 72, 74, 76, 78 and 80 is typically employed for decorating the surface of a cake, either as the cake bakes or as it is later warmed for use at the time it is served. As the envelope 70 becomes heated, the colored liquid frosting or other decorative liquid is forced upwardly due to increasing internal pressure through the hollow tube 76 and out through its upper open end, thereby flowing, i.e., expanding as shown at 82 over the surface of the food 12 to provide a decorative display on the surface of the food for the entertainment of the users.

The example of the invention shown in FIG. 7 preferably has a particular sequence of operation. First, the liquid filling 74 in the envelope 70 begins to liquify. As it softens, it begins to move toward the surface through the tube 76. Positive pressure is created by the envelope 70 or simply by the heat and pressure developed within the envelope 70 due to heating of the fluid 74. In the alternative, pressure can be provided by the envelope 70 itself which is pre-molded to assume a flat form upon heating. The envelope 70 will return to flatness when heated, causing the frosting or filling 74 to move to the surface of the food article 12. Once the filling 74 moves to the surface of the food, the compartment 60 is extended, releasing the candy or sugar 68. This is set to occur at a higher temperature than the release of the frosting 74. The spring 26, when it extends, also causes the compartment 60 to spin on the axis of the shaft 34 as it is released from the housing 14. The food particles 68 are thus dispensed over the surface of the frosting at 82 according to a pre-set sequence of operation.

Figure 8:
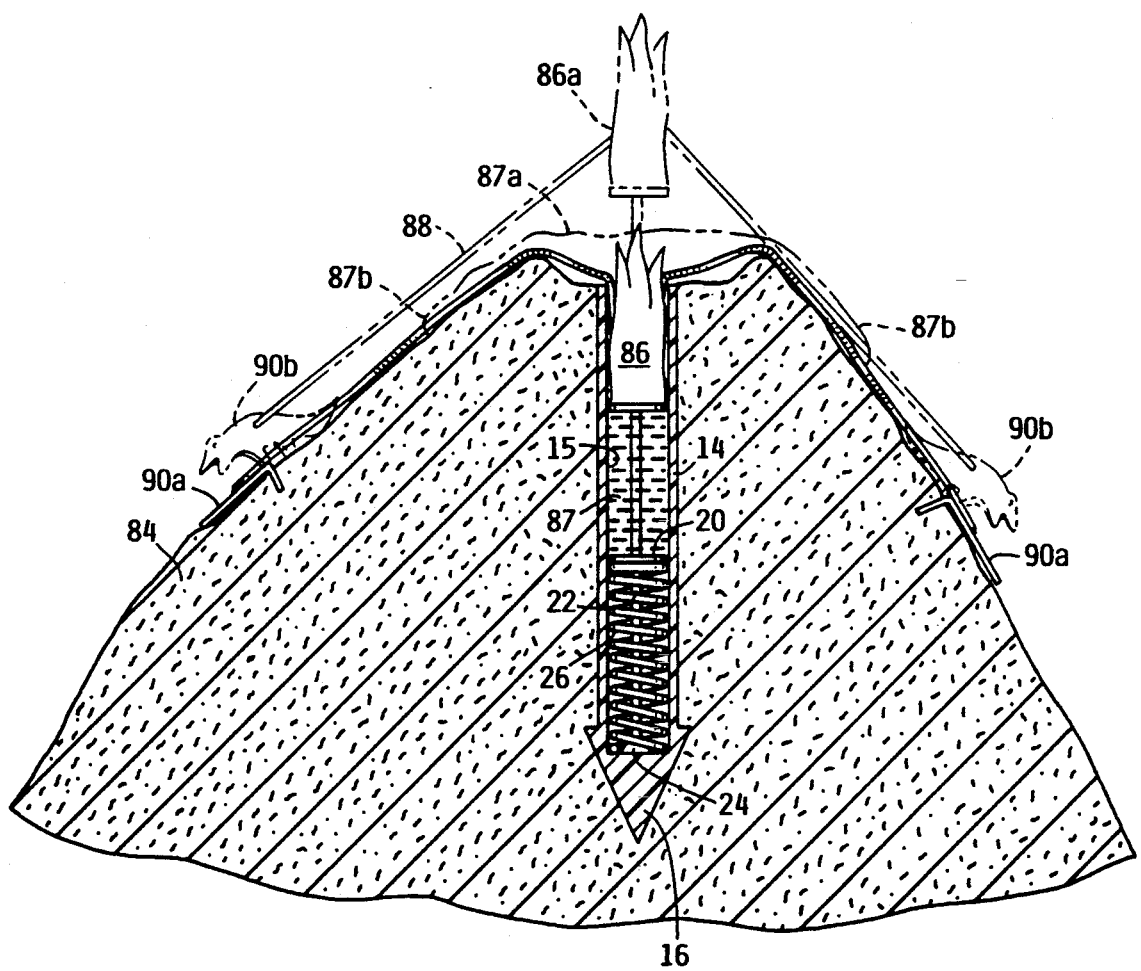
FIG. 8 is a vertical sectional view of yet another form of the invention.

Refer now to FIG. 8 wherein the same parts have been given numbers corresponding to those components already described. The embodiment of FIG. 8 shows the invention applied to what may be termed a "mountain cake," i.e., a relatively high, pointed cake with inclined sides. In this case the plunger 20 has connected to it a vertically disposed, upwardly extending shaft to the top of which is secured a decorative display body 86, e.g. of plastic, in this case representing flames as might emerge from a volcano. Connected to the side of the decorative unit 86 are outwardly and downwardly depending threads 88 which are connected to additional display devices such as fanciful figures, e.g. animals, cartoon characters, etc. formed from paper or plastic sheet material partially embedded in the surface of the cake but initially folded downwardly at 90a but which can be folded upwardly to a deployed, i.e., expanded and visible position when the threads 88 are pulled tight as shown by dotted lines. Between the plunger 20 and the display 86 is a colored fluid 87 which, for the purpose of this form of the invention, can be colored a bright red to represent lava expelled from the volcano at the top of the mountain formed by the body of the mountain cake so that, as the molded red plastic element 86 representing flames is forced upwardly through the top of the cake and up to the dotted line position 86a, the colored syrup 87 representing lava will be expelled as shown at 87a and will flow down the sides of the mountain as shown at 87b while the fanciful animals will be erected to the dotted line position 90b as the threads 88 are pulled tight.

Many variations of the present invention within the scope of the appended claims will be apparent to those skilled in the art once the principles described herein are understood.

What is claimed is:

1. A heat actuated decorative device for the ornamentation of a food product that is to be heated comprising, a hollow decorator support housing adapted to be submerged in said food product at or near an exposed surface of the food, a heat responsive expandable decorative display body concealed inside the support housing, means responsive to heating of the decorative device for expelling said decorative display body out of the support housing to a visible deployed position onto or above the surface of the food, and means expanding the decorative display body outwardly over the surface of the food to provide a visible decorative display for ornamenting the food product.

2. The heat actuated decorative device of claim 1 wherein the housing is a hollow cylinder and the expandable decorative display body comprises a plurality of strands of material held within the housing, means is provided for forcing said strands out through the open top of the housing and said strands thereafter spread apart to assume a visible display position over the food product.

3. The device of claim 2 wherein the strands comprise brightly colored or metallized fibers or strips of plastic that are resilient so as to have an elastic memory which causes them to expand over the surface of the food product when moved to the deployed position.

4. The device of claim 1 wherein the decorative display body comprises a sheet of plastic adapted to unfurl so as to expand over the surface of the food product when moved to the visible deployed position.

5. The device of claim 1 wherein the device contains a plunger within the support housing and the expandable decorative display body is a collapsed sheet of plastic contained within the support housing, means for moving the plunger upwardly through the support housing when heated to a superambient temperature, said collapsed sheet is thereupon released from said support housing and allowed to expand to a display condition at or above the surface of the food product.

6. The device of claim 5 wherein the decorative display body is a sheet of material representing a flag.

7. The device of claim 5 wherein the decorative display body comprises a sheet of material representing an umbrella.

8. The decorative display device of claim 1 wherein the decorative display body comprises a liquid which, upon being heated, is forced upwardly to the surface of the food product and then expands by flowing over the surface of the food product to provide visible decoration that acts as ornamentation for the food product.

9. The device of claim 8 wherein the support housing has a plunger adapted to slide upwardly therein when the device is heated, the fluid is positioned above the plunger whereby the upward movement of the plunger forces the fluid out through the top of the housing onto the surface of the food product.

10. The device of claim 9 wherein the housing has a tray at its upper end communicating with an open mouth at the upper end of the hollow housing.

11. The device of claim 1 wherein the support housing has a plunger that supports a compartment adapted to move from within the support housing to a deployed upper position at or above the surface of the food product and the compartment contains doors that open for dispersing a decorative material onto the surface of the food product.

12. The device of claim 1 wherein the support housing comprises a hollow tube having an upper open mouth adapted to be positioned at or near the surface of the food product, a collapsible receptacle is connected to a lower end of the tube, a decorative fluid is contained within the receptacle and is adapted to flow upwardly through the tube upon being heated and to pass out through the tube and expand onto the surface of the food product to provide a visible decorative display that serves as ornamentation for the food product.

13. The device of claim 1 wherein the support housing contains a plunger adapted to slide upwardly therein, a decorative display element is connected to the top of the plunger, a decorative fluid is provided between the display and the plunger, whereupon when the device is heated, the plunger slides upwardly through the support housing, forcing the decorative display body and the fluid out through the top of the support housing.

14. The decorative display device of claim 13 wherein the decorative display body is connected to other display elements and, upon moving to an upper deployed position, the connection causes the other display elements to be deployed to a visible position to provide further ornamentation for the food product.

15. The device of claim 14 wherein the food product is a mountain cake, the decorative display body is shaped to represent flames, the fluid is brightly colored to represent lava and the other display elements comprise fanciful figures such as animals, cartoon characters or the like normally in a reclining position and being connected to the decorative display body by means of a thread whereby the upward movement of the decorative display body to an upper display position causes the threads to pull on the other display elements to thereby elevate said other display elements to a deployed position.

16. A method of ornamenting food that is uncooked or is partially or completely cooked comprising, installing in the food a heat actuated decorative display device having a display body which moves to the surface of the food when heated, placing the food on the table or other serving location, thereafter applying heat to the food to activate said display device, said heat causing the display body to move to a visible display position at or above the surface of the food for ornamenting the food in full view of persons for whom the display is intended.

17. A decorating device for the ornamentation of a food product that is to be heated comprising, a hollow decorator support housing adapted to be submerged in said food product at or near an exposed surface of the food, a temperature responsive expandable decorative display body comprising spreadable material concealed inside the support housing, means responsive to changing the temperature of the food for expelling said decorative display body out of the support housing to a visible deployed position onto or above the surface of the food, and means expanding the decorative display body outwardly over the surface of the food to provide a visible decorative display for ornamenting the food product.

18. A decorating device for the ornamentation of a food product that is to be placed before an audience for viewing comprising, a hollow decorator support housing adapted to be submerged in said food product at or near an exposed surface of the food and having an upper portion sufficiently close to said surface to enable a portion of the decorating device to be exposed at or above said surface, an expandable decorative display body comprising spreadable material concealed inside the support housing, means connected to the decorating device and operative for allowing the decorative display body to move to a display position that is visible to the audience viewing the food product, and means expanding the decorative display body outwardly over the surface of the food to provide a visible decorative display for ornamenting the food product.

19. The decorating device of claim 18 wherein a resilient member is connected to the expandable decorative display body, the hollow decorator support has an opening at its upper end whereby when the decorating device is operated the resilient member expels the display body out through said opening to a position above the surface of the food.

20. The decorating device of claim 18 wherein the decorative display body comprises a fluid, the hollow decorator support has an opening at an upper end and the fluid is expelled through the opening onto the upper surface of the food for creating a visible display.

* * * * *